(12) United States Patent
Majumder (10) Patent No.: US 9,461,472 B2
(45) Date of Patent: Oct. 4, 2016

(54) CONTROLLING POWER IN A MICRO-GRID (71) Applicant: ABB TECHNOLOGY LTD, Zürich (CH)

(72) Inventor: Ritwik Majumder, Västerås (SE)

(73) Assignee: ABB TECHNOLOGY Ltd, Zürich (CH)

( * ) Notice: Subject to any disclaimer, the term of this patent is extended or adjusted under 35 U.S.C. 154(b) by 0 days.

(21) Appl. No.: 14/903,562

(22) PCT Filed: Jul. 8, 2013

(86) PCT No.: PCT/EP2013/064364
§ 371 (c)(1),
(2) Date: Jan. 7, 2016

(87) PCT Pub. No.: WO2015/003729
PCT Pub. Date: Jan. 15, 2015

(65) Prior Publication Data
US 2016/0197477 A1 Jul. 7, 2016

(51) Int. Cl.
*H02J 3/14* (2006.01)
*H02J 3/38* (2006.01)

(52) U.S. Cl.
CPC .. *H02J 3/14* (2013.01); *H02J 3/38* (2013.01); *H02J 2003/388* (2013.01); *Y02B 70/3225* (2013.01); *Y04S 20/222* (2013.01)

(58) Field of Classification Search
CPC .................................... H02J 3/14; H02J 3/38
See application file for complete search history.

(56) References Cited

U.S. PATENT DOCUMENTS

| 4,575,679 A | * | 3/1986 | Chung | ............. | G01R 19/16542 |
| | | | | | 307/39 |
| 2009/0001815 A1 | * | 1/2009 | Kohler | ...................... | H02J 3/14 |
| | | | | | 307/64 |
| 2012/0104847 A1 | * | 5/2012 | Roscoe | ..................... | H02J 3/00 |
| | | | | | 307/23 |
| 2012/0123602 A1 | | 5/2012 | Sun et al. | | |

(Continued)

OTHER PUBLICATIONS

Rashad Kamel, et al., "Enhancement of Micro-grid dynamic performance subsequent to islanding process using storage batteries," 2010, Iranian Journal of Science & Technology, Transaction B: Engineering, vol. 34, No. B6, pp. 605-618.*

(Continued)

*Primary Examiner* — Thienvu Tran
*Assistant Examiner* — Pinping Sun
(74) *Attorney, Agent, or Firm* — Birch, Stewart, Kolasch & Birch, LLP (57) ABSTRACT

A method and system for controlling electrical power in a micro-grid, especially during islanding when the micro-grid is disconnected from a main grid is described. A potential load shedding for islanding is determined when the micro grid is connected to the main grid. The potential load shedding is performed when a grid switch that connects the micro-grid to a main grid opens. A frequency based load shedding and a frequency based control of power injections to the micro grid may also be performed. The frequency based load shedding is performed with a faster response than the power injection control during islanding. The frequency based power injection control is performed with a faster response than the frequency based load shedding when the micro grid is connected to the main grid. A load shedding controller, an energy storage controller and methods performed by the load shedding controller, and the energy storage controller, respectively, is also provided.

20 Claims, 4 Drawing Sheets

(56) References Cited

U.S. PATENT DOCUMENTS

| 2012/0283888 | A1 | 11/2012 | Mao et al. | |
|---|---|---|---|---|
| 2012/0283890 | A1* | 11/2012 | Fu | H02J 3/14 700/295 |
| 2013/0035800 | A1* | 2/2013 | Kulathu | H02J 3/14 700/295 |
| 2013/0069437 | A1* | 3/2013 | Biallas | H04L 12/413 307/80 |
| 2014/0354234 | A1* | 12/2014 | Sudan | H02J 7/34 320/127 |
| 2015/0333517 | A1* | 11/2015 | Paquin | H02J 3/38 700/286 |

OTHER PUBLICATIONS

Yuanqi Liu, et al,, "Measures to keep islands stable after Power oscillation or out of step islanding," Nov. 8-11, 2009, 8th international conference on advances in Power system control, operation and management, pp. 1-4.*

Ding et al., "Microgrid control and management of state transition period", The Institution of Electrical Engineers, Stevenage, GB, XP002725156, Database accession No. 13224615 & 2012 47th International Universities Power Engineering Conference (UPEC 2012) Sep. 4-7, 2012 London, UK and IEEE Piscataway, NJ, Sep. 7, 2012, 5 pages, Abstract.

Kamel et al., "Enhancement of micro-grid dynamic performance subsequent to islanding process using storage batteries", Iranian Journal of Science and Technology, Transaction B: Engineering, Dec. 2010, vol. 34, No. B6, XP002729103, pp. 605-608.

Liu et al., "Measures to Keep Islands Stable after Power Oscillation or Out of Step Islanding", The Institution of Electrical Engineers, Stevenage, GB, XP002725154, Database accession No. 11177735, & 8th International Conference on Advances in Power System Conctrol, Operation and Management (APSCOM 2009) London, UK, Nov. 11, 2009, 4 pages, Abstract.

Peng et al., "Control and Protection of Power Electronics Interfaced Distributed Generation Systems in a Customer-Driven Microgrid", Power & Energy Society General Meeting, 2009, PES '09, IEEE, 8 pages, see chapter V.

Wei et al., "Fast control strategy for stabilising fixed-speed induction-generator-based wind turbines in an islanded distributed system", The Institution of Electrical Engineers, Stevenage, GB & IET Renewable Power Generation IET UK, May 27, 2013, vol. 7, No. 2, pp. 144-162, Abstract.

* cited by examiner

CONTROLLING POWER IN A MICRO-GRID

TECHNICAL FIELD

The invention relates to power control in a micro-grid, especially controlling a micro-grid when the micro-grid is disconnected from a main grid.

BACKGROUND

In smaller electrical transmission grids, like micro-grids, the frequency and voltage are subjected to larger variations than in a large grid. Micro-grids often rely on power from a larger main grid to provide balanced voltage. Especially, balancing problems may occur if a micro-grid loses a connection to a main grid.

US2012/0283890 (D1) describes a control apparatus for a micro-grid. D1 discuss controlling a micro-grid when the micro-grid is disconnected from a main grid. If power from the main grid is interrupted, a control system may increase the power production and reduce the power consumption of the micro-grid (see FIG. 1 and §37). When power from the main grid is lost, a local controller enters islanded operation from a grid-connected operation (§43-44).

US2012/0283888 (D2) describes an embodiment of the apparatus of D1, wherein a power generation plan is created by a central controller for an islanded operation in order to lessen the balancing problems when the micro-grid is disconnected from a main grid and changes to islanded operation (see abstract, §43). The power generation plan for islanded operation includes increasing power supply and reducing load by load shedding (§45-46). The power generation plan tries to match power supply and load (§45). According to D2, the execution of the power generation plan by the local controller should be performed in a transition being less than 0.6 seconds.

However, the transition phase is the most critical when moving from grid-connected into islanded operation. Execution of a power generation plan that matches supply and load for islanded operation, as suggested in D2, is not optimal for the transition phase. Regulating power supply and perform load shedding during the transition in the same way as matching during islanded operation may also cause balancing problems due to the interaction of the power supply regulation and load shedding operations performed simultaneously during the transition phase. Moreover there is a need for performing a very fast response when the power supply from the main grid is lost. D1 and D2 do not provide details on providing a fast response and no details of the load shedding and power supply being specific for the transition phase.

SUMMARY

An aim of the invention is to lessen the disadvantages of the prior art, and provide a better balancing performance during the transition phase when islanding, i.e. when moving from the grid-connected operation into the islanded operation.

The invention provides a method for controlling electrical power in a micro-grid, especially during islanding, which micro-grid comprises a grid switch that connects the micro-grid to a main grid and is arranged for receiving power from the main grid, at least one power source, and a plurality loads. Preferably, the micro grid includes a plurality of load switches, each load switch arranged for providing power to a respective one of the loads. The micro-grid also includes at least one controller configured for performing load shedding and configured for controlling the at least one power source. The at least one controller is configured to selectively disconnecting each respective load, preferably by being operatively connected to each one of the load switches. The method is performed in a grid-connected mode when the micro-grid is connected to the main grid and in an islanding mode when the connection to the main grid is lost, i.e. when moving from grid-connected mode into islanded mode. The method comprises determining a load shedding for islanding mode during operation in the grid-connected mode, monitoring the status of the grid switch, entering the islanding mode from the grid-connected mode when the grid switch opens and the connection to the main grid is lost, and performing a load shedding upon entering islanding mode by disconnecting one or more of the loads, the load shedding being made in accordance with the determined load shedding.

Such a response being based upon the status of a grid connecting switch provides a fast response, and the method enters into the islanding mode that provides a transition to the islanded mode.

In an embodiment the method includes performing a frequency based regulation by monitoring the frequency in the micro-grid in both the grid-connected mode and in the islanding mode, and includes adjusting the power production of at least one of the power sources on the basis of variations of the frequency, and performing load shedding on the basis of variations of the frequency.

Thus, providing a frequency based regulation in islanding mode.

In an embodiment, the load shedding during islanding mode is performed with a faster response than the adjusting of power production during islanding mode.

In an embodiment, the adjusting of power production in grid-connected mode is performed with a faster response (for smaller variations) than the load shedding.

In an embodiment, the islanding mode further includes determining whether the micro-grid has stabilized, which determining of stabilization preferably is based on the monitored frequency, and entering an islanded mode from the islanding mode when the micro-grid has stabilized, the islanded mode includes monitoring the frequency in the micro-grid, and based on the variations of the frequency adjusting the power production of at least one of the power sources, and also performing load shedding, wherein the adjusting of power production is performed with a faster response than the load shedding during islanded mode.

In an embodiment the method includes monitoring the voltage of the micro-grid, and based on the variations of the voltage adjusting the power production of at least one of the power sources.

In an embodiment, the at least one power source includes means for injecting real power and means for injecting reactive power, the adjusting of power production comprising adjusting both real and reactive power.

The invention also provides a method for controlling electrical power in a micro-grid, which method is performed by a load shedding controller. The micro-grid comprises a grid switch that connects the micro-grid to a main grid for receiving power from the main grid, at least one power source, a plurality of loads, and comprising a load shedding controller configured to perform load shedding by selectively disconnecting each load. For example, the micro-grid includes a plurality of load switches, wherein each load switch is arranged for providing power to a respective load and the controller is operatively connected to each of the load switches and configured to perform the load shedding by means of the load switches. The method is performed by the load shedding controller and is performed in a grid-connected mode when the micro-grid is connected to the main grid and in an islanding mode when the connection to the main grid is lost. The said method comprises obtaining a load shedding indication for islanding mode during operation in the grid-connected mode, monitoring the status of the grid switch, entering the islanding mode from the grid-connected mode when the grid switch opens and the connection to the main grid is lost, and performing a load shedding upon entering islanding mode by disconnecting one or more of the loads, which load shedding is made in accordance with the load shedding indication.

In an embodiment the method further comprises performing a frequency based load shedding during grid-connected mode as well as during islanding mode by monitoring the frequency of the micro-grid, and performing load shedding on the basis of the monitored frequency. The embodiment further includes changing control speed for the frequency based load shedding when entering into the islanding mode from the grid-connected mode.

In an embodiment, the frequency based load shedding is performed with a faster response during operation in islanding mode than during grid-connected mode.

In an embodiment islanding mode further includes determining the stabilization of the micro-grid, and entering an islanded mode when the micro-grid has stabilized, which entering includes changing the control speed for the frequency based load shedding.

In an embodiment, the method further includes performing frequency based load shedding during islanded mode, the frequency based load shedding is performed with a faster response during operation in islanding mode than during islanded mode.

Also, the speed of response of the frequency based load shedding may during islanded mode be the same, or at least approximately the same, as during grid-connected mode.

The invention also provides a method performed by the energy storage controller, which method controls the electrical power in a micro-grid, especially during islanding. The micro-grid comprises a grid switch that provides a connection to a main grid arranged for receiving power from the main grid. The micro-grid further comprises at least one power source including an energy storage, a plurality of loads, and an energy storage controller operatively connected to the energy storage and configured to adjust the power provided by the energy storage. The method is performed by the energy storage controller in a grid-connected mode when the micro-grid is connected to the main grid and in an islanding mode when the connection to the main grid is lost. The method comprises monitoring the frequency in the micro-grid during grid-connected mode, adjusting the supply of power from the energy storage on the basis of the frequency in the grid-connected mode, which adjusting is performed at a first control speed, monitoring the status of the grid switch, entering the islanding mode from the grid-connected mode when the switch opens, and changing the control speed when entering into the islanding mode, which control speed is slower during islanding mode than during grid-connected mode.

In this way the frequency based supply of power do not disturb the balance during the islanding phase.

In an embodiment, the method includes monitoring the voltage in the micro-grid during islanding mode, and adjusting the supply of power from the energy storage on the basis of the voltage monitored in the islanding mode.

In an embodiment, the method includes determining whether the micro-grid stabilizes in islanding mode on the bases of the monitored frequency and/or the monitored voltage, and entering into an islanded mode from the islanding mode when the micro-grid has stabilized.

For example, the stabilization monitoring utilizes a criteria for the stabilization that defines a stabilization interval for the frequency variations and/or voltage variations.

In an embodiment, the method includes changing the control speed, of the energy control, when entering into the islanded mode, said control speed being faster during islanded mode than during islanding mode.

Thus, the methods preferably provide three different operating modes, grid-connected mode, islanding mode and islanded mode, wherein especially the islanding mode primarily uses load shedding. The response of load shedding during islanding is faster than the power injection response. In grid-connected and in islanded mode, the power injections are provided with a faster response than the load shedding response.

The invention also provides a load shedding controller for controlling the electrical power in a micro-grid comprising a grid switch that connects the micro-grid to a main grid, at least one power source, and a plurality of loads.

The load shedding controller is configured to perform load shedding and comprises a load switch controller arranged to selectively disconnect any of the loads, communication means configured to receive a load shedding indication, preferably from a controller of the main grid controller, and means for monitoring the status of the grid switch. The load shedding controller is adapted to perform an event triggered load shedding when the status of the grid connection switch change from connected to disconnected, which event triggered load shedding is made in accordance with a load shedding indication received during grid connection before the status change to disconnected.

In this way, the load shedder enter islanding mode from a grid-connected mode when the status of the grid connection switch change from connected to disconnected.

In an embodiment, the load shedding controller further comprises means for monitoring the frequency of the electrical power in the micro grid and is adapted to perform a frequency based load shedding on the basis of the monitored frequency.

In an embodiment, the load shedding controller is adapted to perform the frequency based load shedding in at least two, and preferably all three, of the following modes; in a grid-connected mode when the micro grid is connected to the main grid, in an islanding mode (i.e. during transition from grid-connected to islanded mode), and in an islanded mode when the micro grid is not connected to the main grid.

In an embodiment, the load shedding controller is adapted to change control speed of the frequency based load shedding when changing mode.

In an embodiment, the load shedding controller is adapted to use a faster response speed during islanding mode than during grid connected mode, and/or use a faster response speed during islanding mode than during islanded mode.

In an embodiment, the load shedding controller is further adapted to determine stabilization of the micro grid on the basis of the monitored frequency, and enter islanded mode from islanding mode when the micro grid has stabilized, and changing control speed of the frequency based load shedding.

The invention also provides a control system for a micro grid, which micro grid comprises a grid switch connecting the micro-grid to a main grid, at least one power source, and a plurality of loads. The control system is configured to perform load shedding by selectively disconnecting any of the loads from the micro grid, and to inject power into the micro grid by means of the at least one power source. The control system comprises communication means configured to receive a load shedding indication, e.g. from a main grid controller, means for monitoring the status of the grid switch, the control system is adapted to perform an event triggered load shedding when the status of the grid connection change from connected to disconnected, which event triggered load shedding is made in accordance with a load shedding indication received during grid connection before the status change to disconnected.

In an embodiment, the control system also comprises means for monitoring the frequency of the electrical power in the micro grid, wherein the control system is adapted to perform frequency based load shedding based on the monitored frequency, and to perform frequency based control for injecting power to the micro grid.

In an embodiment, the control system is adapted to enter into an islanding mode from a grid-connected mode when the status of the grid connection change from connected to disconnected.

In an embodiment, the control system is adapted to use a faster response in grid-connected mode for the frequency based power injections than for the frequency based load shedding, and to use a faster response in islanding mode for the frequency based load shedding than for the frequency based power injections.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 illustrates load shedding control (FIG. 4A) and energy storage control (FIG. 4B) according to an embodiment of the invention.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
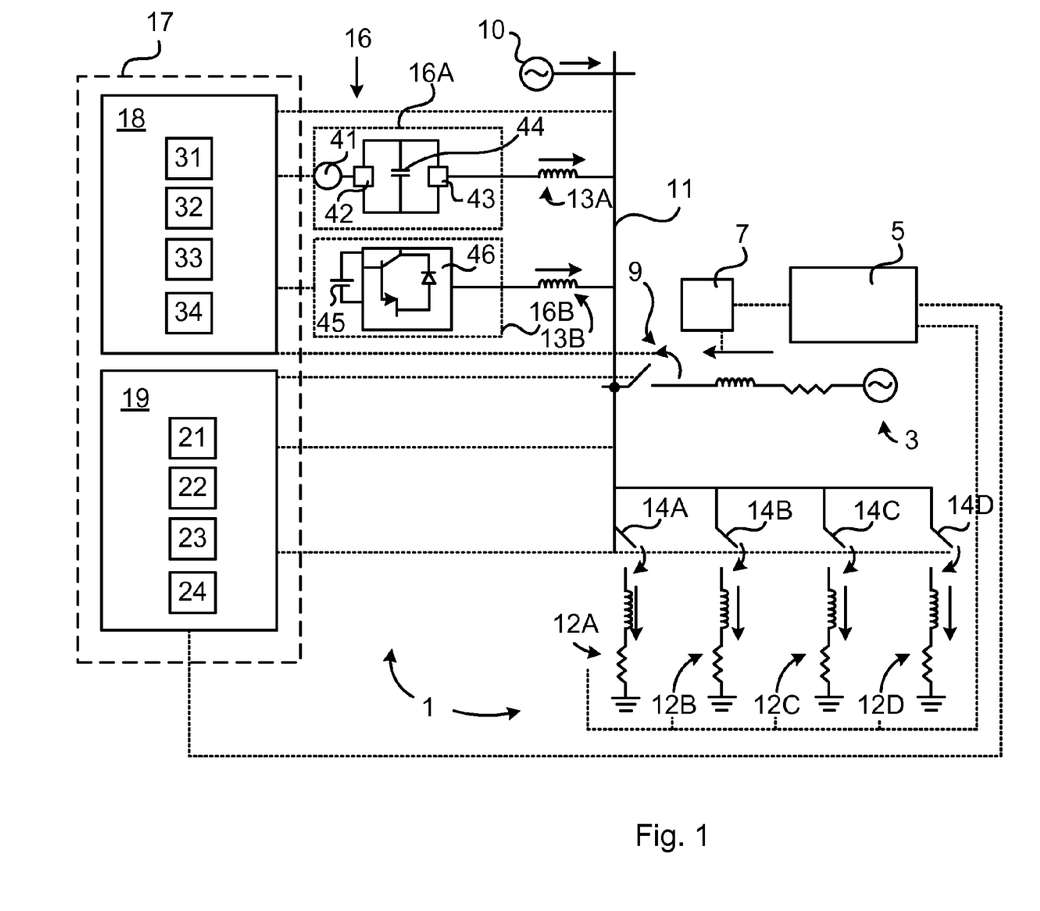
FIG. 1 illustrates a micro-grid system connected to a main grid in accordance with an embodiment of the invention.

FIG. 1 illustrates a micro-grid 1 connected to a main grid 3 by means of a grid connection, or switch, 9. The grid connection 9 is arranged for receiving power from the main grid 1. The main grid 3 includes power sources and at least one controller 5 having means 7 arranged for monitoring power transferred to the micro grid 1. The micro-grid 1 comprises a power source 10 and an energy storage 16 for providing power to the micro-grid in addition to the power supplied from the main grid 3. Also, the power source 10 and the energy storage 16 being provided to supply power to the micro-grid when the grid connection 9 is lost, i.e. when the switch 9 is opened and the supply of power from the main grid to the micro-grid is interrupted.

The micro-grid further includes a number of load connections for supplying power to a number of loads 12A-D, each load connection includes a load switch 14A-D. The micro-grid includes a controller 17 operatively connected to the energy storage and the load switches 14A-D. The controller 17 is configured to control the supply of power from the energy storage 16 to the micro-grid and to perform load shedding by selectively disconnecting any one the loads 12A-D by means of opening a respective one of the load switches 14A-D. The controller 17 includes an energy storage controller 18 provided for controlling the energy storage 16 and a load shedding controller 19 for controlling the load switches 14A-D.

The energy storage 16 is exemplified as including two energy storage units, a first energy storage unit 16A that includes a fly-wheel 41 and a second energy storage unit that includes a battery storage 45.

The first energy storage unit 16A includes a fly-wheel 41 and a voltage source converter (42-44), wherein the fly-wheel being connected to a transmission line 11 of the micro-grid via the voltage source converter (42-44), which voltage source converter comprises an AC/DC converter 42, an energy storage element in the form of a capacitor 44 and an DC/AC inverter 43. The first energy storage unit 16A is connected to the transmission line 11 via a coil 13A.

The second energy storage 16B includes a battery storage 45 and a DC/AC inverter 46, wherein the battery storage 45 provides power to the transmission line 11 via the inverter 46. Also, a coil 16B is arranged between the second energy storage 16B and the transmission line 11, smoothing out the electrical power from the second energy storage unit 16B to the transmission line 11.

The energy storage controller 18 is configured to monitor the power of the micro grid 1, illustrated by the dotted line extending to the transmission line 11, and for this purpose includes means 31 for monitoring the voltage and frequency in the micro-grid 1. The energy storage controller 18 is configured to control the first as well as the second energy storage unit 16A, 16B so as to provide a transfer of electrical energy to and from the transmission line 11 to transfer energy to and from the other parts of the micro-grid 1. For this purpose the energy storage controller 18 includes means 32 for controlling the power supply to and from the first energy storage unit 16A, which means 32 is operatively connected to the first energy storage unit 16A. Similarly, the energy storage controller 18 includes means 34 for controlling the second energy storage 16B, which means 34 for controlling the second energy storage 16B is operatively connected to the second energy storage 16B and configured to control the power to and from the energy storage 16B. The controller 18 being adapted to control the energy storage 16 on the basis of the monitored power in the micro-grid 1, thus based on the monitored frequency and voltage in the transmission line 11.

The energy storage controller 18 is configured to control the power to and from the energy storage 16, and for the purpose of the invention, especially the energy controller 18 is able to inject power by means of the energy storage units 16A, 16B when power is needed in the micro-grid and thereby stabilize the micro-grid. Especially, the energy storage controller 18 is provided to inject power by means of the energy storage 16 when the frequency and/or the voltage in the micro-grid drops. The frequency of the current is monitored and used as a basis for providing injections of real power. The voltage is monitored and on the basis of the monitored voltage, the energy storage controller performs injections of reactive power. Thus, real power injections are frequency based whereas reactive power injections are voltage based.

The energy storage controller 18 is arranged to control the energy storage 16 in a grid connected mode when the micro grid is connected to the main grid, in an islanded mode when the micro grid is not connected to the main grid and also in a transition phase between the grid-connected mode and the islanded mode. During this transition phase or islanding, the energy storage controller 18 controls the energy storage 16 in a, so called, islanding mode. To be able to determine when the connection to the main grid is lost, the controller 18 includes means 33 for monitoring the grid connection 9. These monitoring means 33 includes means responsive to the change of status of the grid connection, for example sensing means arranged at a grid connecting switch 9. The status of the grid-connection 9 is used by the controller 18 to determine when islanding is initiated and the controller is provided to perform a further monitoring of the power of the micro grid, i.e. the monitoring of the frequency and voltage, to determine when the micro grid has stabilized after the disconnection from the grid and entered into islanded mode, which means that the micro-grid has stabilized again after being disconnected.

The controller 18 is adapted to use different criteria for injecting power during the islanding transition phase than the criteria used when connected to the grid. Especially, the stabilization of the micro grid when grid connected is primarily performed by the energy storage controller 18, but during islanding the stabilization is primarily performed by the load shedding controller 19.

Figure 4A:
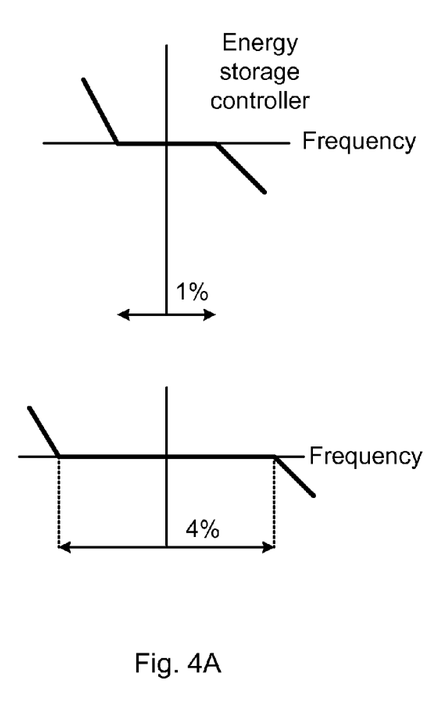

FIG. 4A illustrate an example on how the response speed for injecting power can be changed between grid-connected mode and islanding mode.

FIG. 4A illustrates using a dead-band for frequency control of injecting power from the energy storage, and absorbing power in the energy storage, wherein a dead-band of 1% is used when the micro-grid 1 is connected to the main grid 3 (grid-connected mode), and wherein a dead-band of 4% is used in the transition phase initiated when losing the connection (i.e. islanding mode). Thus, the response speed to a frequency deviation is faster for the energy control in the grid-connected mode compared to islanding mode.

Figure 4B:
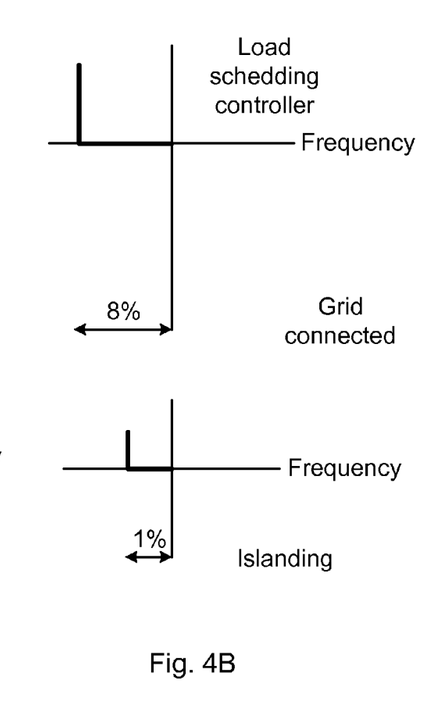

Returning to FIG. 1, the load shedding controller 19 is operatively to the load switches 14A-D to be able to perform the load shedding. The load shedding controller 19 is provided with means 21 for monitoring the frequency of the electrical power in the micro grid 1 as indicated by the dotted line extending between the load shedding controller 19 and the transmission line 11 of the micro grid 1. The load shedding controller is also provided with a load switch controller 22 configured to control the disconnection of each of the loads 12A-D by means of the respective load switch 14A-D. In grid-connected mode, the load shedding controller 19 is adapted to perform the load shedding on the basis of the monitored frequency in the micro-grid 1. Also, in the islanding mode the controller 19 is adapted to perform load shedding on the basis of the frequency but preferably at a different control speed than in the grid-connected mode. An example of different control speeds for the load shedding controller 19 is illustrated in FIG. 4B. FIG. 4B illustrates an example wherein a dead-band used for the frequency is set to 8% in grid-connected mode, and the dead-band used in islanding mode is set to 1%. Thus, the response for a deviation of the frequency is faster in islanding mode than in grid-connected mode for the load shedding controller.

The load shedding is performed only when the frequency falls, when the frequency falls with 8% in grid-connected mode and when the frequency falls with 1% in islanding mode (FIG. 4B). The control of the energy storage is performed both when the frequency falls and when the frequency rises above the nominal value. FIG. 4A illustrates an example where the energy storage controller uses a dead-band of 1% and injects power when the frequency falls with 0.5% in grid-connected mode and injects power when the frequency falls with 2% in islanding mode. Also, the energy storage absorbs power from the micro grid when the frequency rises 0.5% above the nominal frequency in grid connected mode, and absorbs power from the micro grid when the frequency rises 2% in islanding mode. Thus, load shedding is performed at a faster response speed to frequency deviations than power injections during islanding, whereas when connected to the grid it is the other way around.

In islanded mode, i.e. after islanding mode when the micro grid has stabilized, the energy storage control is faster than the load shedding control when the frequency falls. Thus, however not illustrated, FIGS. 4A and 4B can be used for comparing islanded mode and islanding mode by using the grid-connected mode of frequency control as a representation of the islanded mode.

In addition to perform a frequency based load shedding in the micro grid 1, the load shedding controller is also provided to perform an event triggered load shedding. For this purpose the load shedding controller 19 is provided with means 23 for monitoring the status of the grid connection 9 and with communication means 24. The communication means 24 are communicatively connected to a controller 5 of the main grid, and is especially provided to receive a load shedding indication from the main grid controller 5. The load shedding controller 19 is adapted to perform an initial load shedding when islanding in accordance with the load shedding indication received from the main grid controller 5. The load shedding controller is configured to monitor the status of the grid connection 9, using the means 23 for monitoring the grid connection 9, and when the grid connection opens the load shedding controller is adapted to initiate islanding mode by performing a load shedding in accordance with the load shedding indication as received from the controller 5 in the main grid.

The purpose of this event based load shedding is to perform a fast initial load shedding when the power supply from the main grid is interrupted. The purpose is also to perform the event based load shedding to an extent that can reasonably be expected to be needed. To provide a good indication of needed load shedding if the grid connection is lost, the main controller 5 monitors the power supplied from the main grid to the micro grid and determines the fraction or percentage of the supplied power that is supplied to the loads 12A-D. When a certain percentage of the power used by the loads 12A-D originates from the main grid, a first approximation of load shedding needed to stabilize the micro grid if the grid connection is lost, can be performing a load shedding equal to this percentage. However, the determined load shedding percentage need not be equal to the percentage of the power to supplied from the main grid, since power sources to in the micro-grid can be predicted to respond to a power loss by increasing their power production to the micro grid. Thus, the load shedding percentage determined by the controller 5 in the main grid 3 is based on the monitored power supplied from the main grid to the micro grid and the power consumed by the loads 12A-D, but the determination of the load shedding percentage may also include expectations of different behaviour, such as changes of power production, in the main grid. The main controller 5 continuously monitors the power flow, calculates the load shedding and transmits the load shedding indication to the load shedding controller 19 of the micro grid 1.

The load shedding controller 19 is arranged to receive the load shedding indication, e.g. load shedding percentage, repeatedly in grid-connected mode, but only perform a load shedding in accordance with the load shedding percentage as a response to a disconnection event as determined from the monitoring of the status of the grid connection 9. Thus, the load shedding controller 19 performs load shedding in grid-connected mode based solely on the monitored power in the micro grid 1. The load shedding controller 19 is however configured to perform the event triggered load shedding in accordance with the received load shedding indication immediately when islanding is detected, i.e. immediately when determining that the connection 9 to the main grid 3 is lost. After performing the event based load shedding, the load shedding controller 19 continues with providing a frequency based load shedding in islanding mode.

Figure 2:
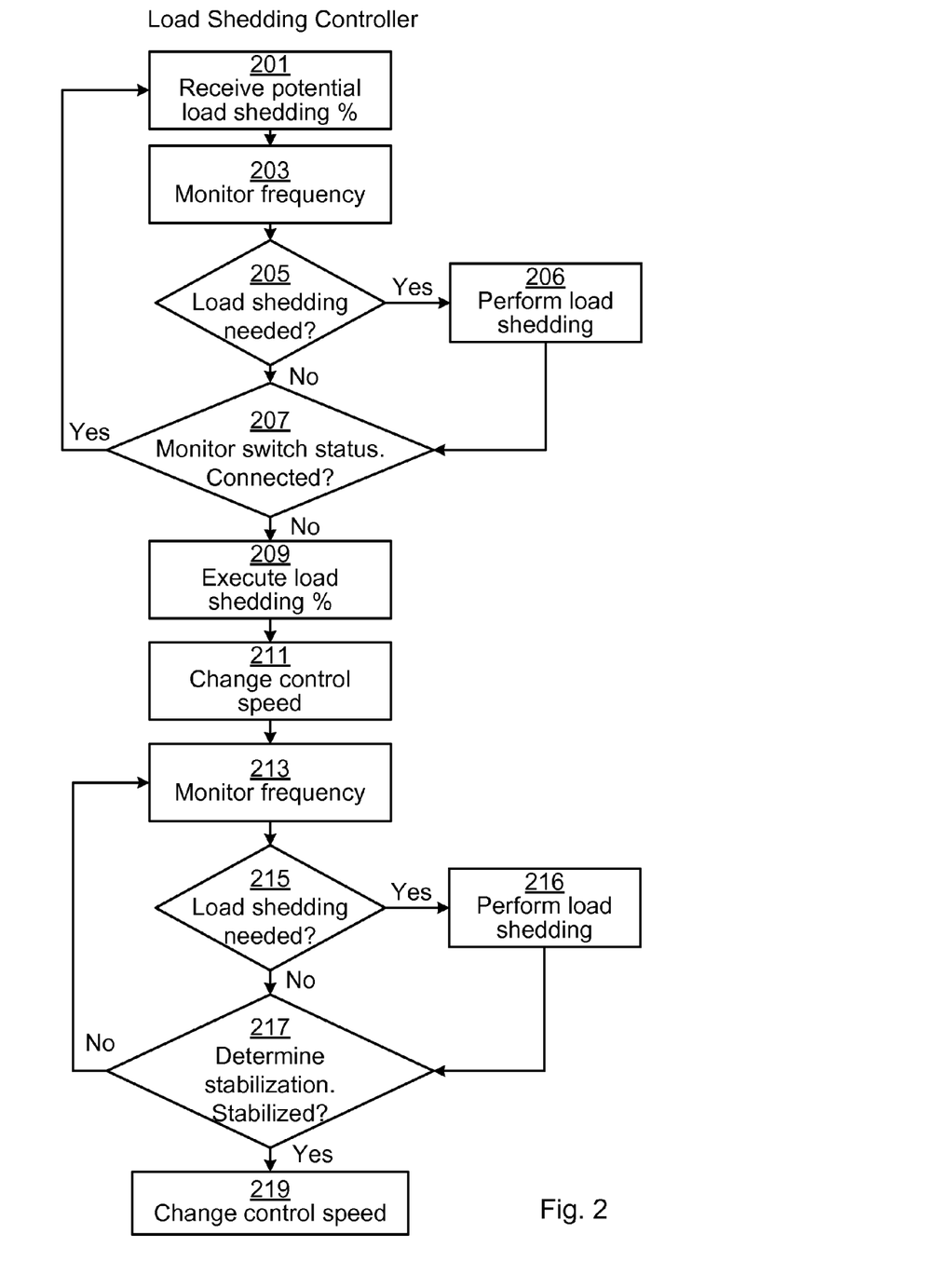
FIG. 2 illustrates a method performed by a load shedding controller according to an embodiment of the invention.
Figure 3:
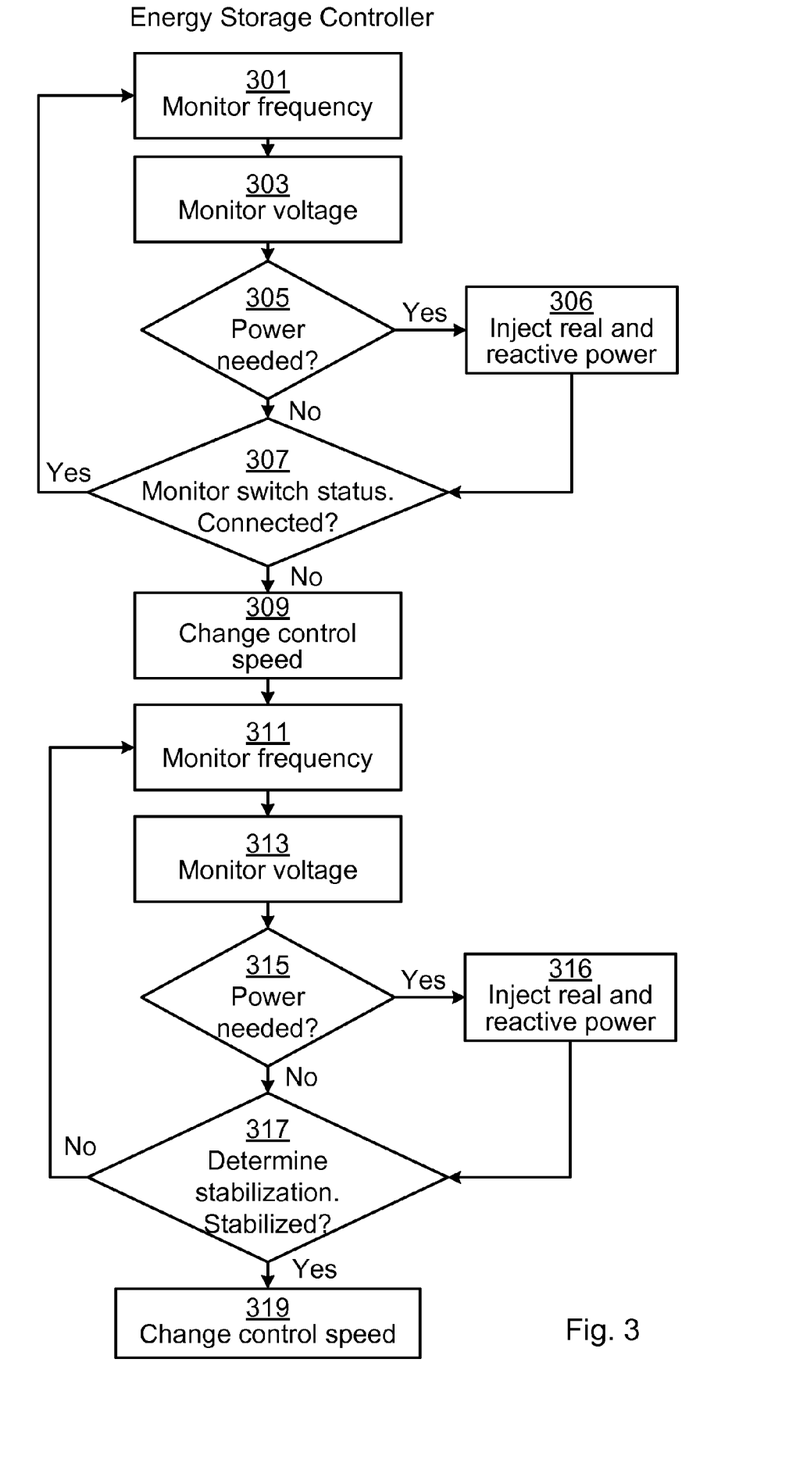
FIG. 3 illustrates a method performed by a energy storage controller according to an embodiment of the invention.

FIGS. 2 and 3 illustrate embodiments of a method performed by the load shedding controller 19 and a method performed by the energy storage controller 18, respectively. In an alternative embodiment, both methods may be performed by a dual-purpose controller 17 adapted to perform load shedding as well as controlling an energy storage.

An aim of the invention is to stabilize a micro grid in a transition phase, so called islanding, when a connection to, and the power supply from, a main grid is lost until the micro grid is stabilized in a disconnected islanded mode. The methods described therefore mainly describe shedding, or disconnecting, loads and injecting power to the micro grid. However it should be noted that, during the stabilization process, power may also be drawn from the micro grid to any of the energy storage units 16.

The method performed by the load shedding controller 19 starts, in the grid-connected mode, by receiving 201 a potential load shedding percentage to be used in the event of losing the grid connection. The grid-connected mode comprises monitoring 203 the frequency of the micro grid, and determining 205 if load shedding is needed on the basis of the monitored frequency. If frequency based load shedding is needed the load shedding controller performs 206 load shedding to stabilize the micro grid. The grid-connected mode also includes monitoring 207 the status of the grid connection 9. If the micro grid is still connected to the main grid, the load shedding controller returns to the step of receiving 201 a potential load shedding percentage, monitoring 203 the frequency, and performing a frequency based load shedding when needed, in steps 205, 206. The grid-connected mode is repeated until the monitoring 207 of the grid connection determines that the grid connection is lost, i.e. the switch is opened. Immediately after determining a lost grid connection the load shedding controller performs 209 a load shedding in accordance with the previously received load shedding percentage, i.e. the last received load shedding indication that was received in the grid-connected mode.

The islanding mode continues with changing 211 control speed for the frequency based load shedding. The islanding mode continues with monitoring the frequency 213, and on the basis of the monitored frequency determining 215 is load shedding is needed to stabilize the micro grid. If needed, islanding mode continues with performing 216 load shedding, i.e. frequency based load shedding. Islanding mode further includes determining 217 if the micro grid has stabilized the determining of stabilization is based on the monitored frequency. Islanding mode continues with monitoring 213 the frequency and performing frequency based load shedding, steps 215, 216 until the micro grid has stabilized. When it is determined 217 that the micro grid has stabilized, the method leaves the islanding mode and enters islanded mode. Islanded mode comprises changing 219 control speed, or response speed, for the frequency based load shedding. The control speed may for example be changed back to the control speed used in grid-connected mode.

Islanded mode preferably continues (however not illustrated) with monitoring the frequency and performing frequency based load shedding in a similar scheme as steps 203, 205, 206 of grid-connected mode.

The control speed used during islanding should be faster than when connected to the main grid. However, more important is that the load shedding is faster than the supply from the energy storage during islanding. Thus, it is contemplated that the control speed of the frequency based load shedding in an alternative embodiment need not be changed, instead the control speed of the energy storage control is changed so that the load shedding response is faster than the energy storage response during islanding.

The method performed by the energy storage controller 18 illustrated in FIG. 3 starts in grid-connected mode with monitoring 301 the frequency and monitoring 303 the voltage of the micro grid. The method continues with determining 305 if power is needed, which determining is based on the frequency and voltage monitored. Also, the method may include determining if energy should be removed from the grid and stored in the energy storage. If power is needed, the method continues with injecting 306 power, real power and or reactive power, to the micro grid. The grid-connected mode of the method also includes monitoring 307 the status of the grid connection, and if still connected the method returns to the steps of monitoring the frequency and voltages 301, 303 and performing 305, 306 a frequency and voltage based injection of power into the micro grid. If determining that the grid connection is lost, in step 307, the method enters islanding mode that starts with changing 309 the control speeds of the frequency based and the voltage based power injection. Thus, islanding mode continues with monitoring 311 the frequency, monitoring the voltage 313 and determining if power is needed 315. If power is needed, as determined on the bases of the monitored frequency 311 and/or the monitored voltage 313, islanding mode continues with the step of injecting 316 real and/or reactive power. Islanding mode continues with determining 317 if the micro grid has stabilized, the determining is made on the bases the monitored frequency and the monitored voltage. If the micro grid has stabilized the energy storage controller enters islanded mode. Otherwise, the energy storage controller continues in islanding mode until the micro grid has stabilized. Thus if the micro grid has not stabilized, the method returns to monitoring 311 the frequency and monitoring 313 the voltage and performing a frequency and voltage based control of power injections, steps 315, 316 until determining 317 that the micro grid has stabilized. When the micro grid has stabilized, the method performed by the energy storage controller enters islanded mode and changes 319 the control speed, or response, of the frequency and voltage based power injections.

An alternative to the change of dead-band size described in FIGS. 4A and 4B, a time delay can be used. Thus, a time delay can be introduced for the frequency and voltage based energy storage control when islanding, so that the load shedding is faster in islanding mode, but the energy storage control is faster in grid-connected mode and in islanded mode.

Thus, a method and system 17 for controlling electrical power in a micro-grid 1, especially during islanding when the micro-grid is disconnected from a main grid 3 has been described. A potential load shedding for islanding is determined when the micro grid 1 is connected to the main grid 3. The potential load shedding is performed when a grid switch 9 that connects the micro-grid to a main grid 3 opens. A frequency based load shedding and a frequency based control of power injections to the micro grid 1 is preferably also performed. In such a case, the frequency based load shedding is performed with a faster response than the power injection control during islanding. Also, the frequency based power injection control is performed with a faster response than the frequency based load shedding when the micro grid 1 is connected to the main grid 3.

Embodiments of a load shedding controller 19, an energy storage controller 18 and methods performed by the load shedding controller, and the energy storage controller, respectively, has also been described.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling electrical power in a micro-grid, which micro-grid comprises a grid switch that connects the micro-grid to a main grid for receiving power from the main grid, at least one power source including an energy storage, a plurality loads, and at least one controller configured for performing load shedding and configured for controlling the at least one power source, the at least one controller being configured to selectively disconnect each respective load, the method being performed in a grid-connected mode when the micro-grid is connected to the main grid, and in an islanding mode when the connection to the main grid is lost, said method comprising the steps of:
    determining a load shedding for islanding mode during operation in the grid-connected mode;
    monitoring the status of the grid switch;
    entering the islanding mode from the grid-connected mode when the grid switch opens;
    performing a load shedding upon entering islanding mode by disconnecting one or more of the loads, the load shedding being made in accordance with the determined load shedding; and
    performing a frequency based regulation by monitoring the frequency in the micro-grid in the grid-connected mode and in the islanding mode, and adjusting the power provided by the energy storage on the basis of variations of the frequency, and performing load shedding on the basis of variations of the frequency, wherein the frequency based load shedding is performed with a faster response than the adjustment of the power provided by the energy storage during islanding mode.

2. The method according to claim 1, wherein the adjustment of power production is performed with a faster response than the load shedding during grid-connected mode.

3. The method according to claim 2, further including, when in the islanding mode, the step of determining whether the micro-grid has stabilized, and entering an islanded mode from the islanding mode when the micro-grid has stabilized, the islanded mode includes monitoring the frequency in the micro-grid, and based on the variations of the frequency adjusting the power production of at least one of the power sources, and performing load shedding, wherein the adjusting of power production being performed with a faster response than the load shedding during islanded mode.

4. The method according to claim 2, including monitoring the voltage of the micro-grid and, based on the variations of the voltage, adjusting the power production of at least one of the power sources.

5. The method according to claim 2, wherein the at least one power source includes means for injecting real power and means for injecting reactive power, and wherein the adjustment of power production comprises adjusting both real and reactive power.

6. The method according to claim 1, further including, when in the islanding mode, the step of determining whether the micro-grid has stabilized, and entering an islanded mode from the islanding mode when the micro-grid has stabilized, the islanded mode includes monitoring the frequency in the micro-grid, and based on the variations of the frequency adjusting the power production of at least one of the power sources, and performing load shedding, wherein the adjusting of power production being performed with a faster response than the load shedding during islanded mode.

7. The method according to claim 6, including monitoring the voltage of the micro-grid and, based on the variations of the voltage, adjusting the power production of at least one of the power sources.

8. The method according to claim 1, including monitoring the voltage of the micro-grid and, based on the variations of the voltage, adjusting the power production of at least one of the power sources.

9. The method according to claim 1, wherein the at least one power source includes means for injecting real power and means for injecting reactive power, and wherein the adjustment of power production comprises adjusting both real and reactive power.

10. A method for controlling electrical power in a micro-grid, especially during islanding, said micro-grid comprising a grid switch connecting the micro-grid to a main grid for receiving power from the main grid, at least one energy storage that provides electrical power to the micro-grid and adjusts the power on the basis of variations of the frequency in the micro grid, a plurality of loads, and comprising a load shedding controller configured to perform load shedding by selectively disconnect the loads, the method being performed by the load shedding controller, the method being performed in a grid-connected mode when the micro-grid is connected to the main grid and in an islanding mode when the connection to the main grid is lost, said method comprising the steps of:
    obtaining a load shedding indication for islanding mode during operation in the grid-connected mode;
    monitoring the status of the grid switch;

entering the islanding mode from the grid-connected mode when the grid switch opens;

performing a load shedding upon entering islanding mode by disconnecting one or more of the loads, the load shedding being made in accordance with the load shedding indication; and performing a frequency based load shedding during grid-connected mode and during islanding mode by monitoring the frequency of the micro-grid, and performing load shedding on the basis of the monitored frequency, the method further includes changing control speed for the frequency based load shedding when entering into the islanding mode from the grid-connected mode, wherein the frequency based load shedding being performed with a faster response during operation in islanding mode than during grid-connected mode, so that the frequency based load shedding response is faster than the frequency based power adjusting response of the energy storage during islanding mode.

11. The method according to claim 10, wherein islanding mode further includes determining stabilization of the micro-grid, and entering an islanded mode when the micro-grid has stabilized, which entering includes changing the control speed for the frequency based load shedding.

12. The method according to claim 11, further including performing frequency based load shedding during islanded mode, the frequency based load shedding being performed with a faster response during operation in islanding mode than during islanded mode, preferably the response during islanded mode being the same, or at least approximately the same, as in grid-connected mode.

13. A method for controlling electrical power in a micro-grid, especially during islanding, said micro-grid comprising a grid switch for providing a connection to a main grid for receiving power from the main grid, at least one power source including an energy storage, a plurality of loads, and comprising an energy storage controller operatively connected to the energy storage and configured to adjust the power provided by the energy storage, the method being performed in a grid-connected mode when the micro-grid is connected to the main grid, and in an islanding mode when the connection to the main grid is lost, the method being performed by the energy storage controller said method comprising the steps of:

monitoring the frequency in the micro-grid during grid-connected mode;

adjusting the supply of power from the energy storage on the basis of the frequency in the grid-connected mode, which adjustment is performed at a first control speed;

monitoring the status of the grid switch;

entering the islanding mode from the grid-connected mode when the switch opens; and changing the control speed when entering into the islanding mode, said control speed being slower during islanding mode than during grid-connected mode, so that a load shedding response in the micro-grid is faster than the energy storage response during islanding mode.

14. The method according to claim 13, including monitoring the voltage in the micro-grid during islanding mode, and adjusting the supply of power from the energy storage on the basis of the monitored voltage in the islanding mode.

15. The method according to claim 13, further adapted to determine whether the micro-grid stabilizes in islanding mode on the basis of the monitored frequency and/or the monitored voltage, and entering into an islanded mode from the islanding mode when the micro-grid has stabilized.

16. The method according to claim 15, including changing the control speed when entering into the islanded mode, said control speed being faster during islanded mode than during islanding mode.

17. The method according to claim 13, including monitoring the frequency in the micro-grid during islanding mode, and adjusting the supply of power from the energy storage on the basis of the frequency in the islanding mode, which adjusting is performed using the changed control speed.

18. A load shedding controller for controlling electrical power in a micro-grid comprising a grid switch connecting the micro-grid to a main grid, at least one power source, and a plurality of loads, the load shedding controller being configured to perform load shedding and comprising:

a load switch controller arranged to selectively disconnect any of the loads;

a communication receiver configured to receive a load shedding indication;

a first monitor configured to monitor a status of the grid switch;

the load shedding controller being adapted to perform an event triggered load shedding when the status of the grid connection changes from connected to disconnected, which event triggered load shedding is made in accordance with the load shedding indication received during grid connection before the status changes to disconnected; and a second monitor configured to monitor a frequency of the electrical power in the micro grid, the load shedding controller being adapted for performing frequency based load shedding based on the monitored frequency, wherein the load shedding controller:

is adapted to perform the frequency based load shedding in at least two of the following modes:

in a grid-connected mode when the micro grid is connected to the main grid;

in an islanding mode; and in an islanded mode when the micro grid is not connected to the main grid; is adapted to change control speed of the frequency based load shedding when changing mode; and is adapted to use a faster response speed for the frequency based load shedding during islanding mode than during grid connected mode, or use a faster response speed for the frequency based load shedding during islanding mode than during islanded mode, in order to provide a faster frequency based load shedding response during islanding than a response of an energy storage of the micro-grid.

19. The load shedding controller according to claim 18, being further adapted to determine stabilization of the micro grid on the basis of the monitored frequency, and enter islanded mode from islanding mode when the micro grid has stabilized, including changing control speed of the frequency based load shedding.

20. A control system for a micro grid, which micro grid comprises a grid switch connecting the micro-grid to a main grid, at least one power source including an energy storage, and a plurality of loads, the control system being configured to perform load shedding by selectively disconnecting any of the loads from the micro grid, and to inject power into the micro grid by the energy storage, said control system comprising:

a communication receiver configured to receive a load shed indication;

a first monitor configured to monitor a status of the grid switch;

the control system being adapted to perform an event triggered load shedding when the status of the grid connection changes from connected to disconnected, which event triggered load shedding is made in accordance with the load shedding indication received during grid connection before the status changes to disconnected; and a second monitor configured to monitor a frequency of the electrical power in the micro wherein the control system is adapted to perform frequency based load shedding based on the monitored frequency, and to perform frequency based power injection control to the micro grid, wherein the control system is adapted to enter into an islanding mode from a grid-connected mode when the status of the grid connection change from connected to disconnected, and wherein the control system is adapted to use a faster response in grid-connected mode for the frequency based power injections than for the frequency based load shedding, and to use a faster response in islanding mode for the frequency based load shedding than for the frequency based power injection control.

* * * * *